(12) United States Patent
Ansari et al.

(10) Patent No.: US 10,504,409 B2
(45) Date of Patent: Dec. 10, 2019

(54) DISPLAY SYNCHRONIZATION

(71) Applicant: INTEL CORPORATION, Santa Clara, CA (US)

(72) Inventors: Nausheen Ansari, Folsom, CA (US); Gal Yedidia, Haifa (IL)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 15/253,359

(22) Filed: Aug. 31, 2016

(65) Prior Publication Data
US 2018/0061303 A1    Mar. 1, 2018

(51) Int. Cl.
G09G 3/20    (2006.01)
G09G 5/12    (2006.01)
G09G 5/00    (2006.01)

(52) U.S. Cl.
CPC ......... G09G 3/2092 (2013.01); G09G 3/2018 (2013.01); G09G 5/12 (2013.01); G09G 5/008 (2013.01); G09G 2310/0291 (2013.01)

(58) Field of Classification Search
CPC ...... G09G 3/20; G09G 3/2092; G09G 3/2018; G09G 2310/0291; G09G 5/008; G09G 5/12
See application file for complete search history.

(56) References Cited

U.S. PATENT DOCUMENTS

| | | | | |
|---|---|---|---|---|
| 6,483,447 B1 * | 11/2002 | Eglit | ...................... | G09G 5/008 341/111 |
| 6,744,472 B1 * | 6/2004 | MacInnis | .................. | G06T 9/00 341/61 |
| 2006/0262229 A1 * | 11/2006 | Takeda | ............... | H04N 21/2368 348/725 |
| 2010/0272102 A1 * | 10/2010 | Kobayashi | ......... | H04N 21/4305 370/389 |
| 2010/0318697 A1 * | 12/2010 | Siulinski | ............. | H04L 12/2803 710/70 |
| 2011/0013707 A1 * | 1/2011 | Walker | ................ | G06F 13/4295 375/259 |
| 2012/0026156 A1 * | 2/2012 | Chen | ...................... | G09G 5/005 345/214 |
| 2013/0080916 A1 * | 3/2013 | Lopez | .................... | H04N 5/445 715/753 |
| 2013/0141426 A1 * | 6/2013 | Atkinson | ........... | H04N 13/0438 345/419 |

(Continued)

Primary Examiner — Henry Tsai
Assistant Examiner — Christopher Daley
(74) Attorney, Agent, or Firm — International IP Law Group, P.L.L.C.

(57) ABSTRACT

Techniques for synchronizing a display transmitter and display panel are described. An example display panel includes a timing controller to receive display data from a transmitter and render the display data on a display screen of the display panel. The display panel is in a first clock domain and the transmitter is in a second clock domain which is derived separately from the first clock domain. The display panel also includes a time code generator to generate a first display time code and a frequency adjuster to receive a second display time code from the transmitter. The frequency adjuster adjusts the clock frequency of the display panel based on the first display time code and the second display time code.

25 Claims, 6 Drawing Sheets

(56) References Cited

U.S. PATENT DOCUMENTS

| | | | | |
|---|---|---|---|---|
| 2016/0192302 A1* | 6/2016 | Bar Bracha | ............. | H04L 1/205 |
| | | | | 370/350 |
| 2017/0345375 A1* | 11/2017 | Cho | ..................... | G09G 3/2092 |
| 2018/0061352 A1* | 3/2018 | Kim | ..................... | G09G 3/3677 |
| 2018/0061365 A1* | 3/2018 | Lee | ........................ | G09G 3/006 |
| 2018/0107239 A1* | 4/2018 | Anderson | ................. | G06F 1/04 |

* cited by examiner

600

DISPLAY SYNCHRONIZATION

TECHNICAL FIELD

This disclosure relates generally to techniques for operating an electronic display. More specifically, the disclosure describes techniques for synchronizing a display transmitter and a display panel.

BACKGROUND

Display panels such as televisions and computer monitors work in real-time and cannot be data starved. Display panels generally do not have a throttling mechanism from the display panel back to the display transmitter. Display panels also generally do not have any significant buffering and any buffer, if present, should not be allowed to overflow. For these reasons, display systems are designed so that the display data is present when the display panel is ready to consume the data. Currently, display technologies use a dedicated link to transfer data from the display transmitter to the display panel. This dedicated link is supposed to provide a guaranteed transfer of data with fixed latencies, which enables the display panel and the display transmitter to maintain synchronization.

DETAILED DESCRIPTION

The subject matter disclosed herein relates to techniques for synchronizing a display transmitter and a display panel without the use of a dedicated link. Rather than a dedicated link, the link between the display panel and the video source is a shared transport mechanism with a converged PHY (physical layer) and single connector. Because the link can be shared with other devices, the latency at which data is transported over the link between the display panel and the video source may no longer be reliably fixed. Thus, traditional techniques for maintaining synchronization between the display panel and the display transmitter are not suitable for a shared link.

In the techniques described herein, the display transmitter sends data over a shared link to the panel buffer. The display transmitter and the panel buffer are operating in their own independently derived display clock domains. The difference in the clock frequencies will cause a drift to accumulate, which could result in overflow when the transmitter clock frequency is higher than the panel frequency or underflow when the transmitter clock frequency is lower than the panel frequency. To avoid this, a DTC (Display Time Code) mechanism is used to enable the display panel to adjust its display clock frequency to closely track the display clock frequency of the display transmitter.

Figure 1:
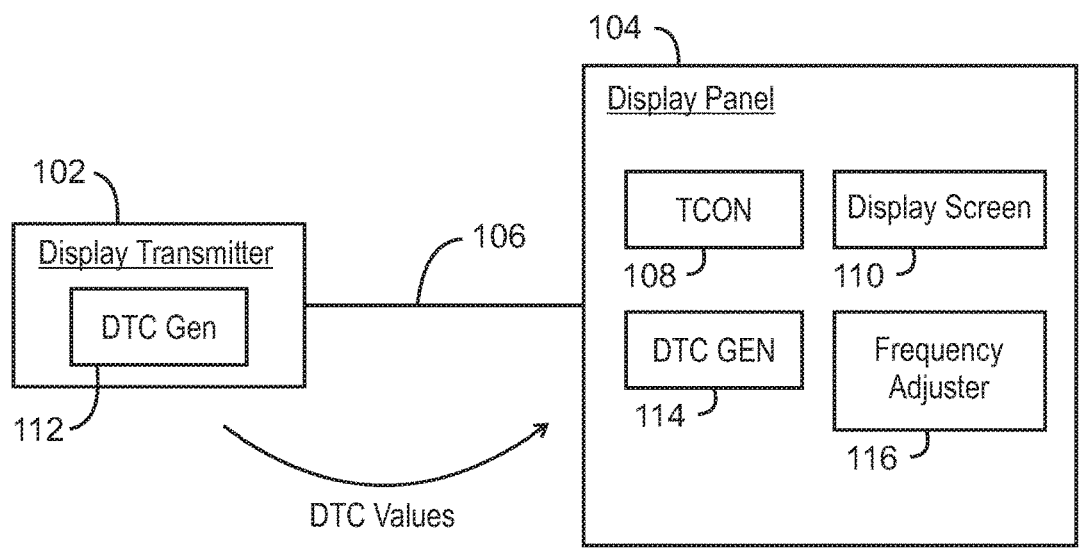
FIG. 1 is a block diagram of an example system for synchronizing a display transmitter and a display panel.

FIG. 1 is a block diagram of an example system for synchronizing a display transmitter and a display panel. The system 100 includes a display transmitter 102 and a display panel 104 coupled together by a shared link 106. The display transmitter 102 may be any type of electronic device capable of transmitting display data, including a media player such as a cable box, a digital video recorder (DVR), a video game system, a disc player, and others. The display transmitter 102 could also be a computer, a smart phone, or a tablet PC, for example. The display transmitter 102 may send display data to the display panel 104 as uncompressed frames of display data which are transmitted at approximately the frame rate of the display panel 104.

The display panel 104 is any type of electronic visual display device. Examples include a television, a computer monitor, and others. The display panel 104 includes a timing controller (TCON) 108 and a display screen 110, which includes the matrix of pixels for rendering the video images. The timing controller 108 is the data sink for the frame of display data and drives the display panel 104.

The link may be implemented according to one of several communication protocols, such as Universal Serial Bus (USB), Thunderbolt, Peripheral Component Interconnect Express (PCIe), and others. The link may be implemented, at least in part, through the use of a cable coupled to both the display transmitter 102 and the display panel 104 through standard cable connectors suitable for the protocol used. In some examples, the connectors are type-C USB connectors.

The link 106 is a shared link meaning that other devices (not shown) may also be coupled to one another through the same link 106. For example, the link 106 could include a hub, such as a USB hub, into which additional devices may be plugged. Because the link 106 can be shared with other devices, the latency with which data is transferred over the link 106 cannot be relied on to be consistent over time. Additionally, the display transmitter 102 and the display panel 104 are in different clock domains. In other words, the display transmitter 102 and the display panel 104 each generate their own separate clock signals, which are not derived from a common source.

Because the display transmitter 102 and the display panel 104 are in different clock domains, there is a possibility that the two frequencies of the two clock signals will tend to vary independently and drift out of synchronization. The difference in the clock frequencies will cause a drift to accumulate and result in overflow when the transmitter clock frequency is higher than the panel frequency or underflow when the transmitter clock frequency is lower than the panel frequency.

To avoid this problem and maintain synchronization, the display transmitter 102 and the display panel 104 each generate a code referred to herein as a Display Time Code (DTC). The display transmitter 102 includes a DTC generator 112 and the display panel 104 includes a DTC generator 114. The display panel 104 also includes a frequency adjuster 116 used to adjust the frequency of the display panel 104 to stay in synch with the display transmitter 102.

The DTC generator 112 of the display transmitter 102 periodically generates a DTC value using its local pixel clock. This DTC values are transmitted across the transport with a variable transport delay. The DTC generator 114 of the display panel 104 also periodically generates a DTC value using its local pixel clock.

After receiving the DTC value from the display transmitter 102, the frequency adjuster 116 compares the DTC value generated locally with the DTC value received from the display transmitter 102. Based on this comparison, the frequency adjuster 116 adjusts the clock frequency of the display panel 104 so it can track the clock frequency of the display transmitter 102. If the DTC value generated by the display transmitter 102 exceeds the DTC value generated by the display panel 104, the pixel clock frequency of the display panel 104 is proportionately raised to compensate for the difference in frequency. If the DTC value generated by the display transmitter 102 is less than the DTC value generated by the display panel 104, the pixel clock frequency is proportionately reduced to compensate for the difference in frequency. The adjustment of the pixel clock frequency may be accomplished determining the ratio between the DTC value generated by the source and the DTC value generated by the sink and using the ratio as the divider values to adjust the Phase Lock Loop of the pixel clock in the display panel 104. The periodic adjustment of the display panel 104 clock will prevent a drift between the display transmitter clock and display panel clock.

As mentioned above, the latency with which data is transferred over the link 106 can vary over time. The variable latency can prevent the display panel 104 from accurately distinguishing frequency drift of the display transmitter from mere changes in the latency with which the DTC value was transmitted. Accordingly, the techniques described below can compensate for the variable latency.

The particular technique used to compensate for the variable latency may depend on the type of communication protocol used by the link. Two different techniques are described in relation to FIGS. 2-4. However, it will be appreciated that other techniques may also be possible. It is to be understood that the block diagram of FIG. 1 is not intended to indicate that the computing device 100 is to include all of the components shown in FIG. 1. Rather, the computing device 100 can include fewer or additional components not illustrated in FIG. 1. Furthermore, any of the functionalities of the display transmitter 102 and the display panel 104 may be partially, or entirely, implemented in hardware and/or in a processor. For example, the functionality may be implemented in one or more Application Specific Integrated Circuit (ASICs), Field Programmable Gate Array (FPGAs), logic circuits, general purpose processors configured to run computer code, and combinations thereof.

Figure 2:
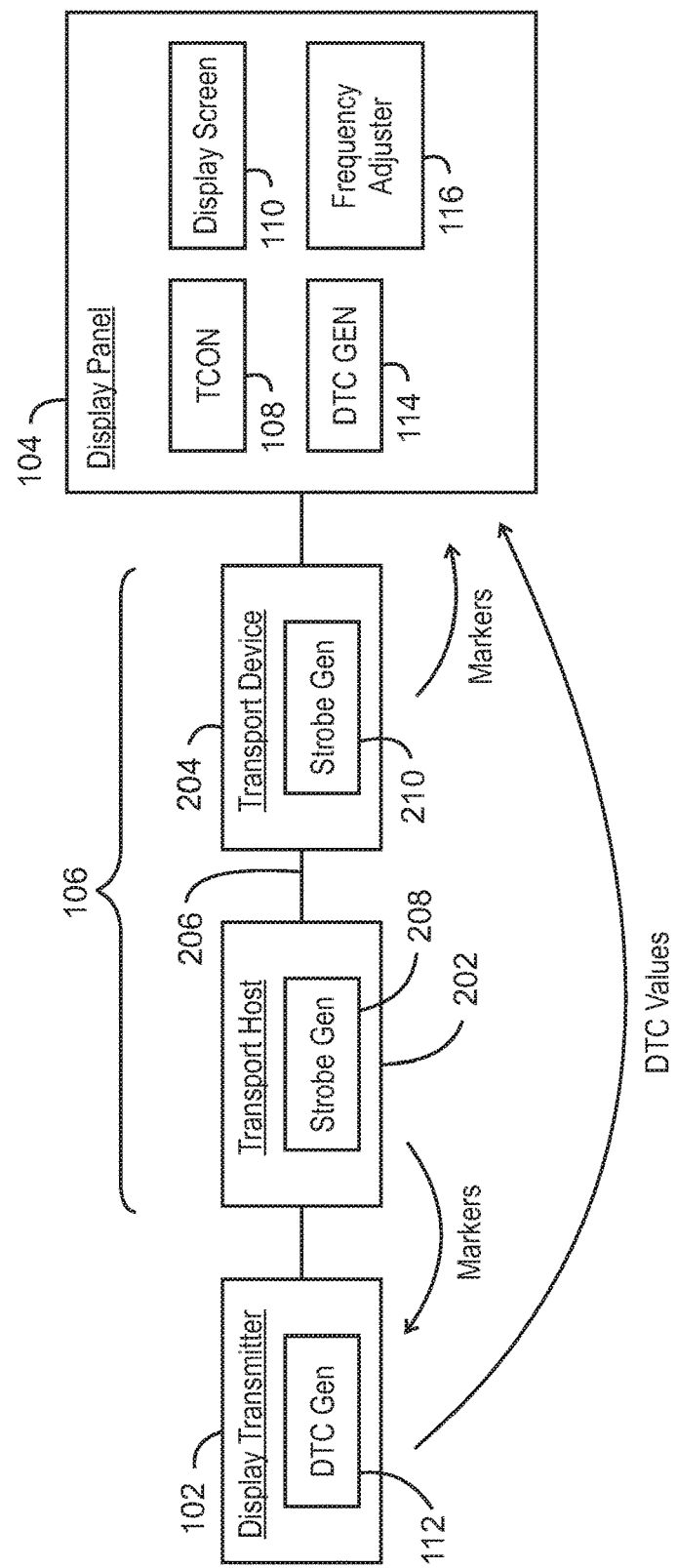
FIG. 2 is a block diagram of another example system for synchronizing a display transmitter and a display panel.

FIG. 2 is a block diagram of another example system for synchronizing a display transmitter and a display panel. The system 100 includes the display transmitter 102 and the display panel 104 described in relation to FIG. 1. In this example, the link 106 between the display transmitter 102 and the display panel 104 includes a transport host 202 and a transport device 204 coupled by a transport link 206. The transport host 202 and transport device 204 are in the same clock domain and share a common time base. However, that common time base does not extend to the display transmitter 102 and display panel 204, which are in different clock domains.

The display transmitter 102 and the transport host 202 may be included in the same device enclosure and communicatively coupled by a data bus. Similarly, the display panel 104 and the transport device 204 may be included in the same device enclosure and communicatively coupled by a data bus. Accordingly, the transport host 204 may be considered as being a component of the display transmitter 102 the transport device 204 may be considered as being a component of the display panel 104.

In this example, the transport mechanism provides a strobe signal. As such, the transport host 202 includes a strobe generator 208 and the transport device 204 includes a strobe generator 210. The strobe generator 208 of transport host 202 periodically sends strobe markers to the display transmitter 102 and the strobe generator 210 of transport device 204 periodically sends strobe markers to the display panel 104. The strobes are generated at a fixed interval, for example, every 1 millisecond.

The display transmitter 102 and display panel 104 both generate the DTC values in coordination with the strobe markers. Since the transport host 202 and the transport device 204 are in the same clock domain, the markers can be generated at the same synchronized frequency. Because the markers share a common frequency, the DTC value generation and frequency adjustment process can also be synchronized to that common frequency. The operation of the system shown in FIG. 2 is described further below in relation to FIG. 3.

Figure 3:
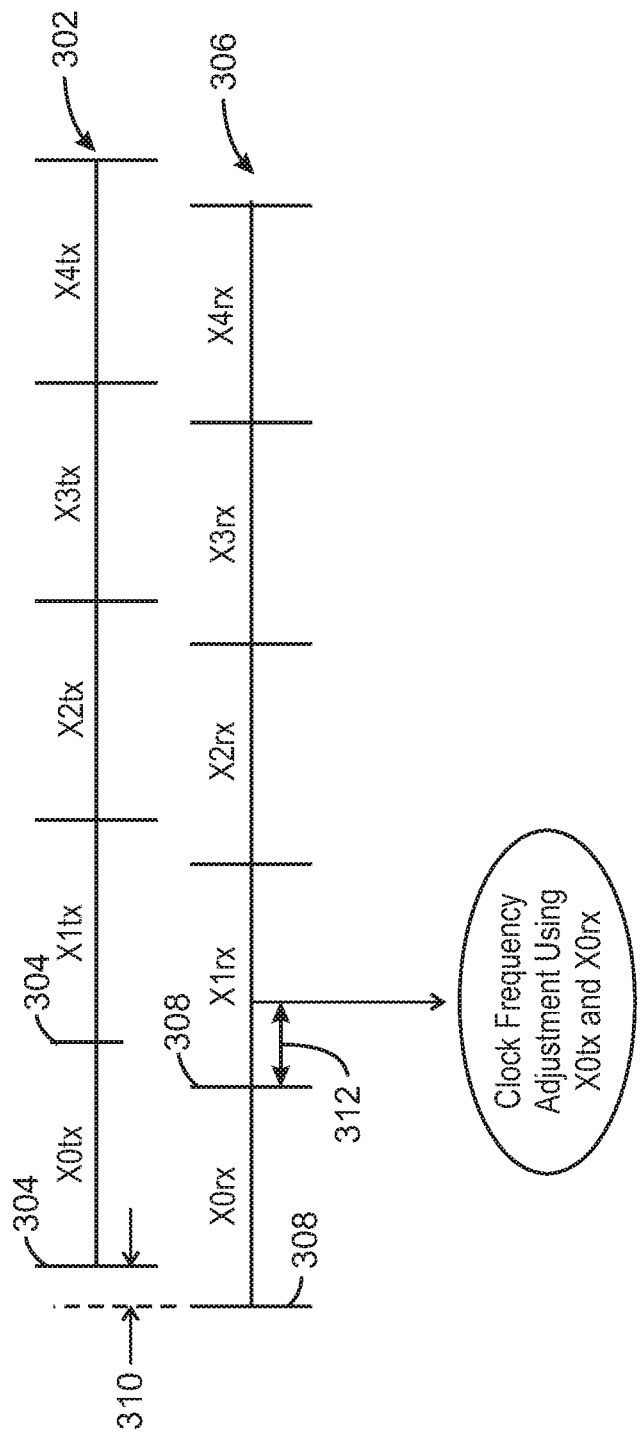
FIG. 3 is a timing diagram showing the operation of the system shown in FIG. 2.

FIG. 3 is a timing diagram showing the operation of the system shown in FIG. 2. The top line 302 represents the display transmitter and the bottom line represents the display panel. The top line shows the strobe markers 304 being generated by the strobe generator 208 and received by the display transmitter 102. In response to receiving the marker, the display transmitter 102 generates a DTC value. Each DTC value generated at the display transmitter represents the number of clock cycles counted at the display transmitter between the strobe markers 304. The DTC values generated by the display transmitter 102 are shown as $X0_{tx}$, $X1_{tx}$, $X2_{tx}$, $X3_{tx}$, and $X4_{tx}$. These values are transmitted to the display panel 104. Considering the leftmost strobe marker 304 as the first strobe marker, the DTC value $X0_{tx}$ is transmitted after the second strobe marker, the DTC value $X1_{tx}$ is transmitted after the third strobe marker, and so on.

The bottom line 306 shows the strobe markers 308 being generated by the strobe generator 210 and received by the display panel 104. In response to receiving the strobe markers 308, the display panel 104 generates its own local DTC values. Each DTC value generated at the display panel represents the number of clock cycles counted at the display panel between the strobe markers 308. Considering the leftmost strobe marker 308 as the first strobe marker, the DTC value $X0_{rx}$ is generated after the second strobe marker, the DTC value $X1_{rx}$ is generated after the third strobe marker, and so on. The DTC values generated by the display panel 102 are shown as $X0_{rx}$, $X1_{rx}$, $X2_{rx}$, $X3_{rx}$, and $X4_{rx}$. The locally generated DTC values are compared to the DTC values received from the display transmitter 102. As explained above, the clock frequency of the display panel 104 is adjusted based on this comparison of the local and received DTC values.

The DTC values generated by the display transmitter are transmitted across the transport with a variable transport delay, which results in the skew 310. To account for the skew 310, the clock frequency adjustment is performed after a fixed interval 312 from the locally generated strobe marker 308. This helps to ensure that the local DTC value generated by the DTC generator 114 of the display panel 104 is being compared to the correct DTC value received by the display transmitter 102.

Figure 4:
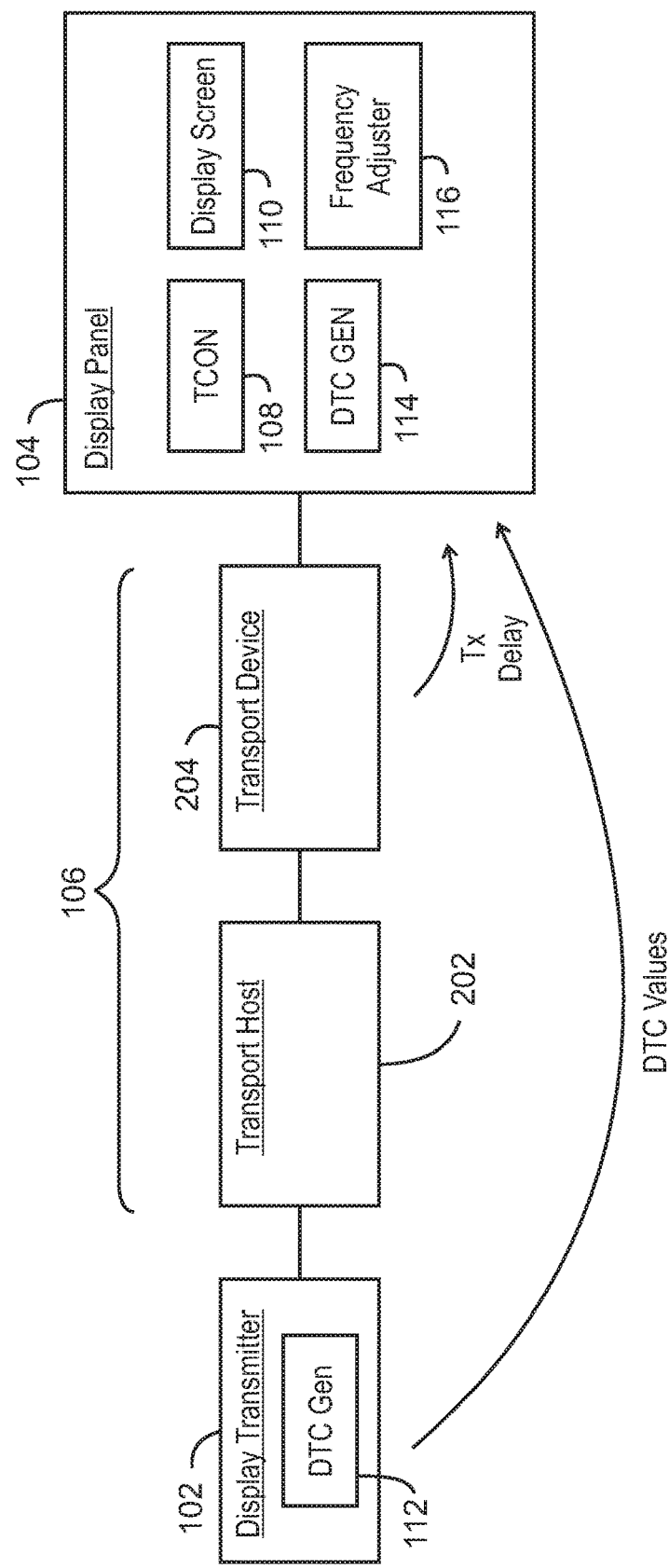
FIG. 4 is a block diagram of another example system for synchronizing a display transmitter and a display panel.

FIG. 4 is a block diagram of another example system for synchronizing a display transmitter and a display panel. The system 100 includes the display transmitter 102, the display panel 104, and the link 106. The link 106 between the display transmitter 102 and the display panel 104 includes a transport host 402 and a transport device 404 coupled by a transport link 406. As before, the transport host 202 and transport device 204 are in the same clock domain and share a common time base, while the display transmitter 102 and display panel 204 are in different clock domains.

In this example, the strobe signal is not used. In some examples, the transport mechanism may not be capable of providing a strobe signal. For example, the transport mechanism may be a PCI Express bus. However, the technique described in relation to FIG. 4 can be used even if the strobe signal is available but not used.

In the example system of FIG. 4, the display transmitter 102 periodically generates and transmits the DTC value to the display panel 104 after a specified interval, which is determined based on its own internal clock. The specified interval may be a fixed interval such as 1 millisecond. The DTC value may be transmitted to the display panel 104 through the transport layer as a data packet.

To account for the transmission delay through the link 106, the transport layer tracks the absolute transmission delay of the DTC data packet through the link 106 based on the transport clock. For example, the transport host 202 may attach a time stamp to the DTC data packet indicating the time that the DTC data packet was received from the display transmitter 102. Upon receiving the DTC data packet, the transport device 204 can read this time stamp and compare it to the current time to determine the transmission delay. The transport device 204 then attaches the transmission delay value to the DTC data packet. The display panel 104 will receive the DTC value along with the absolute transmission delay. The transmission delay of the DTC packet may be expressed in nanoseconds, for example.

Upon receiving the DTC data packet, the frequency adjuster 116 adjusts the locally generated DTC value generated by the DTC generator 114 to account for the transmission delay. For example, the frequency adjuster 116 may multiply the absolute transmission delay with the clock frequency of the display panel 104 to obtain a value which represents the absolute transmission delay in units of clock cycles. This value may then be added to the locally generated DTC value to generate the adjusted DTC value. The adjusted DTC value is compared to the DTC value received from the DTC generator 112 of the display transmitter 102, and the clock frequency of the display panel 104 can be adjusted based on this comparison.

Figure 5:
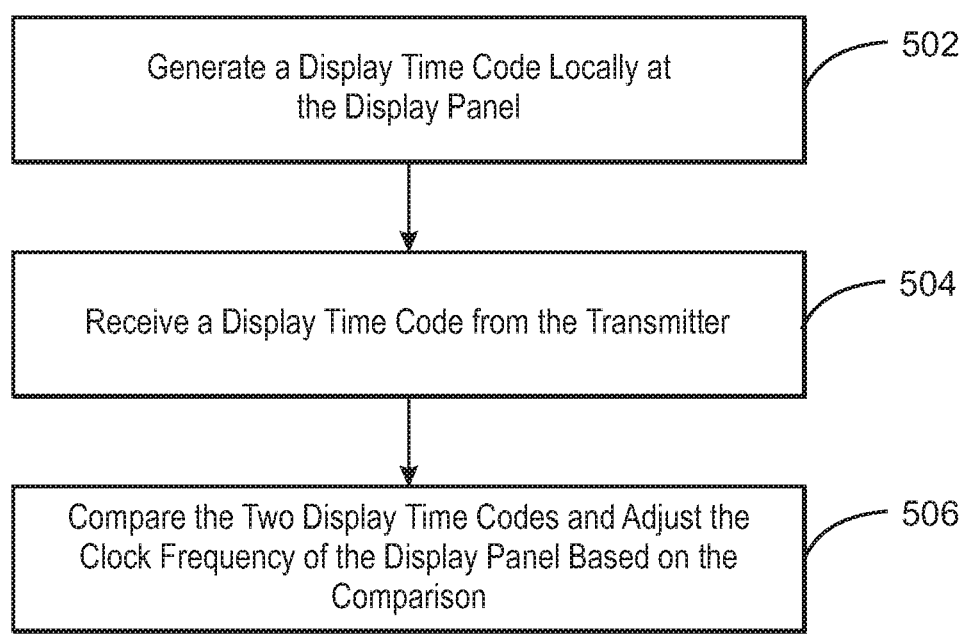
FIG. 5 is a process flow diagram of an example method of operating a display.

FIG. 5 is a process flow diagram of an example method of operating a display. The method 500 may be performed by a display panel and implemented by logic included in the display panel. The logic is embodied in hardware, such as logic circuitry or one or more processors configured to execute instructions stored in a non-transitory, computer-readable medium. Additionally, the method is performed by a display panel that is actively receiving display data from a display transmitter and rendering the display data on the display screen. As explained above, the display panel is in a first clock domain and the display transmitter is in a second clock domain which is derived separately from the first clock domain. The method 500 is performed periodically to ensure that the clock frequencies of the display panel and the display transmitter remain closely matched. The method 500 may begin at block 502.

At block 502, a display time code (DTC) is generated locally at the display panel. At block 504, another display time code is received from the transmitter. At block 506, the two display time codes are compared and the clock frequency of the display panel is adjusted based on the comparison.

In some examples, the time codes are generated and the clock frequency is adjusted in synchronization with a strobe signal generated by the data transport mechanism. For example, strobe markers that mark each strobe of the strobe signal may be generated by the data transport circuitry and sent to the display panel's frequency adjuster. The comparing and the adjusting can occur after a specified time interval beyond receiving the marker.

In some examples, the data transport mechanism determines the transmission delay for the display data and the clock frequency of the display panel is adjusted based in part on the transmission delay. For example, the locally generated display time code can be adjusted based on the transmission delay.

The method 500 should not be interpreted as meaning that the blocks are necessarily performed in the order shown. Furthermore, fewer or greater actions can be included in the method 500 depending on the design considerations of a particular implementation.

Figure 6:
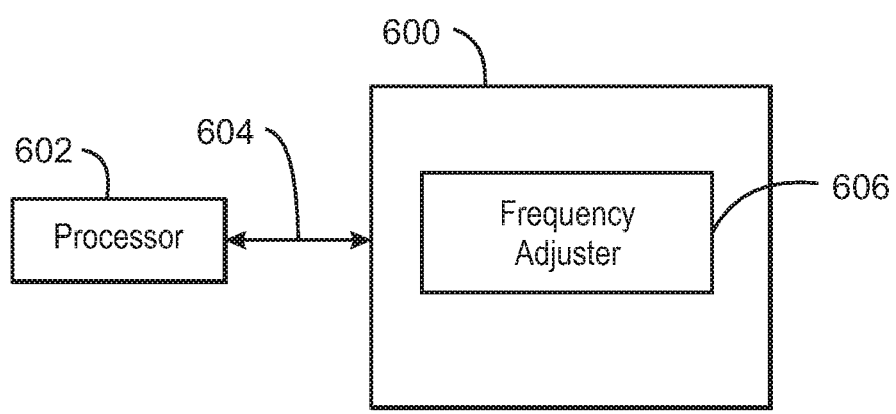
FIG. 6 is a block diagram showing a medium 600 that contains logic for operating a display.

FIG. 6 is a block diagram showing a medium 600 that contains logic for operating a display. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules configured to perform the techniques described herein. For example, a module 606 may be configured to receive display time code data and adjust the clock frequency of the display panel to match the clock frequency of the display transmitter in accordance with the techniques described herein. In some embodiments, the module 606 may be modules of computer code configured to direct the operations of the processor 602.

The block diagram of FIG. 6 is not intended to indicate that the medium 600 is to include all of the components shown in FIG. 6. Further, the medium 600 may include any number of additional components not shown in FIG. 6, depending on the details of the specific implementation.

EXAMPLES

Example 1 is a display panel. The display panel includes a timing controller to receive display data from a transmitter and render the display data on a display screen of the display panel, wherein the display panel is in a first clock domain and the transmitter is in a second clock domain which is derived separately from the first clock domain; a time code generator to generate a first display time code; and a frequency adjuster to receive a second display time code from the transmitter and adjust a clock frequency of the display panel based on the first display time code and the second display time code.

Example 2 includes the display panel of example 1, including or excluding optional features. In this example, the display panel is to communicatively couple to the transmitter through a shared link.

Example 3 includes the display panel of any one of examples 1 to 2, including or excluding optional features. In this example, the display panel includes a transport device to be communicatively coupled to a transport host of the transmitter, the transport device to receive the display data from transport host and deliver the display data to the timing controller. Optionally, the transport device is to generate a strobe signal, and the frequency adjuster is to periodically adjust the clock frequency of the display panel in synchronization with the strobe signal. Optionally, the transport device is to send a marker to the display panel to mark each strobe of the strobe signal and the frequency adjuster is to compare the first display time code and the second display time code after a specified time interval beyond receiving the marker. Optionally, the transport device is to determine a transmission delay for the display data, and the frequency adjuster is to adjust the clock frequency of the display panel based in part on the transmission delay.

Example 4 includes the display panel of any one of examples 1 to 3, including or excluding optional features. In this example, the display panel comprises a Universal Serial Bus (USB) protocol transport device to enable the display panel to communicatively couple to the transmitter.

Example 5 includes the display panel of any one of examples 1 to 4, including or excluding optional features. In this example, the display panel includes a USB Type-C connector to enable the display panel to communicatively couple to the transmitter.

Example 6 includes the display panel of any one of examples 1 to 5, including or excluding optional features. In this example, the display panel is a computer monitor.

Example 7 includes the display panel of any one of examples 1 to 6, including or excluding optional features. In this example, the display panel is a television.

Example 8 is a method of operating a display panel. The method includes receiving display data from a transmitter and rendering the display data on a display screen of a display panel, wherein the display panel is in a first clock domain and the transmitter is in a second clock domain which is derived separately from the first clock domain; generating a first display time code locally at the display panel; receiving a second display time code from the transmitter; comparing the first display time code and the second display time code; and adjusting a clock frequency of the display panel based on the comparing.

Example 9 includes the method of example 8, including or excluding optional features. In this example, the transmitter and the display panel are communicatively coupled through a shared link.

Example 10 includes the method of any one of examples 8 to 9, including or excluding optional features. In this example, the display panel comprises a transport device to be communicatively coupled to a transport host of the transmitter, wherein the transport device and the transport host have a common time base.

Example 11 includes the method of any one of examples 8 to 10, including or excluding optional features. In this example, the method includes receiving a strobe signal and periodically adjusting the clock frequency of the display panel in synchronization with the strobe signal. Optionally, the method includes receiving a marker that marks each strobe of the strobe signal, wherein the comparing and the adjusting occur after a specified time interval beyond receiving the marker.

Example 12 includes the method of any one of examples 8 to 11, including or excluding optional features. In this example, the method includes receiving a transmission delay for the display data, wherein adjusting the clock frequency of the display panel comprises adjusting the first display time code based on the transmission delay.

Example 13 includes the method of any one of examples 8 to 12, including or excluding optional features. In this example, the transmitter and the display panel are communicatively coupled through a Universal Serial Bus (USB) protocol link.

Example 14 includes the method of any one of examples 8 to 13, including or excluding optional features. In this example, the transmitter and the display panel are communicatively coupled through a USB Type-C connector.

Example 15 includes the method of any one of examples 8 to 14, including or excluding optional features. In this example, the display panel is a computer monitor.

Example 16 includes the method of any one of examples 8 to 15, including or excluding optional features. In this example, the display panel is a television.

Example 17 is a tangible, non-transitory, computer-readable medium comprising instructions that, when executed by a processor, direct the processor to operate a display panel. The computer-readable medium includes instructions that direct the processor to receive display data from a transmitter, the display data to be rendered on a display screen of the display panel, wherein the display panel is in a first clock domain and the transmitter is in a second clock domain which is derived separately from the first clock domain; generate a first display time code locally at the display panel; receive a second display time code from the transmitter; and adjust a clock frequency of the display panel based on a comparison of the first display time code and the second display time code.

Example 18 includes the computer-readable medium of example 17, including or excluding optional features. In this example, the display panel is to communicatively couple to the transmitter through a shared link.

Example 19 includes the computer-readable medium of any one of examples 17 to 18, including or excluding optional features. In this example, the computer-readable medium includes instructions that direct the processor to periodically adjust the clock frequency of the display panel in synchronization with a strobe signal generated by a transport device through which the display data is received. Optionally, the computer-readable medium includes instructions that direct the processor to wait for a specified time interval after receiving a strobe marker before adjusting the clock frequency. Optionally, the computer-readable medium includes instructions that direct the processor to receiving a transmission delay for the display data, wherein to adjust the clock frequency of the display panel the processor is to adjust the first display time code based on the transmission delay.

Example 20 is an apparatus for displaying video. The apparatus includes instructions that direct the processor to a display screen for displaying video; means for receiving display data from a transmitter and rendering the display data on the display screen, wherein the apparatus is in a first clock domain and the transmitter is in a second clock domain which is derived separately from the first clock domain; means for generating a first display time code locally at the apparatus; means for receiving a second display time code from the transmitter; and means for comparing the first display time code and the second display time code and adjusting a clock frequency of the apparatus based on the comparing.

Example 21 includes the apparatus of example 20, including or excluding optional features. In this example, the transmitter and the apparatus are communicatively coupled through a shared link.

Example 22 includes the apparatus of any one of examples 20 to 21, including or excluding optional features. In this example, the apparatus includes a transport device to be communicatively coupled to a transport host of the transmitter, wherein the transport device and the transport host have a common time base.

Example 23 includes the apparatus of any one of examples 20 to 22, including or excluding optional features. In this example, the apparatus includes means for generating a strobe signal, wherein the means for comparing and adjusting periodically adjust the clock frequency of the display panel in synchronization with the strobe signal.

Example 24 includes the apparatus of any one of examples 20 to 23, including or excluding optional features. In this example, the means for comparing and adjusting receives a marker that marks each strobe of the strobe signal, wherein the comparing and the adjusting occur after a specified time interval beyond receiving the marker. Optionally, the apparatus includes means for receiving a transmission delay for the display data, wherein the means for comparing and adjusting adjusts the first display time code based on the transmission delay.

Example 25 includes the apparatus of any one of examples 20 to 24, including or excluding optional features. In this example, the transmitter and the apparatus are communicatively coupled through a Universal Serial Bus (USB) protocol link.

Example 26 includes the apparatus of any one of examples 20 to 25, including or excluding optional features. In this example, the transmitter and the apparatus are communicatively coupled through a USB Type-C connector.

Example 27 includes the apparatus of any one of examples 20 to 26, including or excluding optional features. In this example, the apparatus is a computer monitor.

Example 28 includes the apparatus of any one of examples 20 to 27, including or excluding optional features. In this example, the apparatus is a television.

Example 29 is a display transmitter. The display transmitter includes instructions that direct the processor to a transport host to send display data to a display panel, wherein the display panel is in a first clock domain and the transmitter is in a second clock domain which is derived separately from the first clock domain; and a time code generator to generate a display time code and send the display time code to the display panel via the transport host; and wherein the display panel uses the display time code to adjust a clock frequency of the display panel to maintain synchronization with the display transmitter.

Example 30 includes the display transmitter of example 29, including or excluding optional features. In this example, the display transmitter is configured to couple to the display panel through a shared link. Optionally, the transport host is to generate a strobe signal, and the time code generator is to periodically generate the display time code and send the display time code to the display panel in synchronization with the strobe signal.

Example 31 includes the display transmitter of any one of examples 29 to 30, including or excluding optional features. In this example, the transport host uses a Universal Serial Bus (USB) protocol.

Example 32 includes the display transmitter of any one of examples 29 to 31, including or excluding optional features. In this example, the display transmitter includes a USB Type-C connector to enable the display transmitter to communicatively couple to the display panel.

Example 33 includes the display transmitter of any one of examples 29 to 32, including or excluding optional features. In this example, the display transmitter is a desktop computer.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A display panel comprising:
    a timing controller to receive display data from a transmitter and render the display data on a display screen of the display panel, wherein the display panel is in a first clock domain and the transmitter is in a second clock domain which is derived separately from the first clock domain;
    a time code generator to generate a first display time code; and
    a frequency adjuster to receive a second display time code from the transmitter and adjust a clock frequency of the display panel based on the first display time code and the second display time code.

2. The display panel of claim 1, wherein the display panel is to communicatively couple to the transmitter through a shared link.

3. The display panel of claim 1, comprising a transport device to be communicatively coupled to a transport host of the transmitter, the transport device to receive the display data from transport host and deliver the display data to the timing controller.

4. The display panel of claim 3, wherein the transport device is to generate a strobe signal, and the frequency adjuster is to periodically adjust the clock frequency of the display panel in synchronization with the strobe signal.

5. The display panel of claim 4, wherein the transport device is to send a marker to the display panel to mark each strobe of the strobe signal and the frequency adjuster is to compare the first display time code and the second display time code after a specified time interval beyond receiving the marker.

6. The display panel of claim 3, wherein the transport device is to determine a transmission delay for the display data, and the frequency adjuster is to adjust the clock frequency of the display panel based in part on the transmission delay.

7. The display panel of claim 1, wherein the display panel comprises a Universal Serial Bus (USB) protocol transport device to enable the display panel to communicatively couple to the transmitter.

8. The display panel of claim 1, comprising a USB Type-C connector to enable the display panel to communicatively couple to the transmitter.

9. The display panel of claim 1, wherein the display panel is a computer monitor.

10. The display panel of claim 1, wherein the display panel is a television.

11. A method of operating a display panel comprising:
    receiving display data from a transmitter and rendering the display data on a display screen of a display panel, wherein the display panel is in a first clock domain and the transmitter is in a second clock domain which is derived separately from the first clock domain;
    generating a first display time code locally at the display panel;
    receiving a second display time code from the transmitter;
    comparing the first display time code and the second display time code; and
    adjusting a clock frequency of the display panel based on the comparing.

12. The method of claim 11, wherein the transmitter and the display panel are communicatively coupled through a shared link.

13. The method of claim 11, wherein the display panel comprises a transport device to be communicatively coupled to a transport host of the transmitter, wherein the transport device and the transport host have a common time base.

14. The method of claim 11, comprising receiving a strobe signal and periodically adjusting the clock frequency of the display panel in synchronization with the strobe signal.

15. The method of claim 14, comprising receiving a marker that marks each strobe of the strobe signal, wherein the comparing and the adjusting occur after a specified time interval beyond receiving the marker.

16. The method of claim 11, comprising receiving a transmission delay for the display data, wherein adjusting the clock frequency of the display panel comprises adjusting the first display time code based on the transmission delay.

17. The method of claim 11, wherein the transmitter and the display panel are communicatively coupled through a Universal Serial Bus (USB) protocol link.

18. The method of claim 11, wherein the transmitter and the display panel are communicatively coupled through a USB Type-C connector.

19. The method of claim 11, wherein the display panel is a computer monitor.

20. The method of claim 11, wherein the display panel is a television.

21. A tangible, non-transitory, computer-readable medium comprising instructions that, when executed by a processor, direct the processor to operate a display panel, the instructions to direct the processor to:
    receive display data from a transmitter, the display data to be rendered on a display screen of the display panel, wherein the display panel is in a first clock domain and the transmitter is in a second clock domain which is derived separately from the first clock domain;
    generate a first display time code locally at the display panel;
    receive a second display time code from the transmitter; and
    adjust a clock frequency of the display panel based on a comparison of the first display time code and the second display time code.

22. The computer-readable medium of claim 21, wherein the display panel is to communicatively couple to the transmitter through a shared link.

23. The computer-readable medium of claim 21, comprising instructions that direct the processor to periodically adjust the clock frequency of the display panel in synchronization with a strobe signal generated by a transport device through which the display data is received.

24. The computer-readable medium of claim 23, comprising instructions that direct the processor to wait for a specified time interval after receiving a strobe marker before adjusting the clock frequency.

25. The computer-readable medium of claim 23, comprising instructions that direct the processor to receiving a transmission delay for the display data, wherein to adjust the clock frequency of the display panel the processor is to adjust the first display time code based on the transmission delay.

* * * * *